United States Patent
Ikuno

(10) Patent No.: US 9,733,606 B2
(45) Date of Patent: Aug. 15, 2017

(54) PRINTING APPARATUS AND CONTROL METHOD FOR DELETING AN AREA OF IMAGE DATA BEFORE PRINTING AND BINDING

(71) Applicant: CANON KABUSHIKI KAISHA, Tokyo (JP)

(72) Inventor: Takao Ikuno, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/989,718

(22) Filed: Jan. 6, 2016

(65) Prior Publication Data

US 2016/0116882 A1 Apr. 28, 2016

Related U.S. Application Data

(63) Continuation of application No. 14/086,743, filed on Nov. 21, 2013, now Pat. No. 9,242,500.

(30) Foreign Application Priority Data

Nov. 30, 2012 (JP) .................................. 2012-262451

(51) Int. Cl.

| G06K 15/00 | (2006.01) |
| G03G 15/00 | (2006.01) |
| B42C 99/00 | (2006.01) |
| B65H 37/04 | (2006.01) |
| G06K 15/02 | (2006.01) |

(Continued)

(52) U.S. Cl.
CPC ........... G03G 15/6544 (2013.01); B42B 5/00 (2013.01); B42C 1/12 (2013.01); B42C 99/00 (2013.01); B65H 37/04 (2013.01); G03G 15/6541 (2013.01); G06K 15/1807 (2013.01); G06K 15/404 (2013.01); B65H 2220/02 (2013.01);

(Continued)

(58) Field of Classification Search
None
See application file for complete search history.

(56) References Cited

U.S. PATENT DOCUMENTS

| 8,629,991 B2 * | 1/2014 | Zaima ................ G06K 17/0016 |
| | | 358/1.13 |
| 8,976,406 B2 * | 3/2015 | Ikuno ................ G06K 15/1867 |
| | | 358/1.1 |

(Continued)

FOREIGN PATENT DOCUMENTS

| JP | 2007-178973 A | 7/2007 |
| JP | 2008-026488 A | 2/2008 |
| JP | 2011-184154 A | 9/2011 |

*Primary Examiner* — Miya J Williams
(74) *Attorney, Agent, or Firm* — Canon USA, Inc. I.P. Division

(57) ABSTRACT

Even when a binding process for binding a plurality of sheets without using a staple is performed after performing printing on both faces of the sheets, the binding process can be performed so that the bound sheets are not easily separated. A control method for controlling a printing apparatus, comprises: performing a binding process for binding, without using a staple, a sheet on which an image is printed based on image data; specifying an area where the binding process is to be performed, the area being included in the image data; deleting image data of the specified area; and printing the image on the sheet based on the image data on which deleting is performed.

15 Claims, 12 Drawing Sheets

(51) Int. Cl.
*B42B 5/00* (2006.01)
*B42C 1/12* (2006.01)
(52) U.S. Cl.
CPC *B65H 2301/5126* (2013.01); *B65H 2511/232* (2013.01); *B65H 2801/27* (2013.01)

(56) References Cited

U.S. PATENT DOCUMENTS

| | | | |
|---|---|---|---|
| 9,242,500 B2* | 1/2016 | Ikuno | B42C 99/00 |
| 2007/0216973 A1* | 9/2007 | Tagawa | G03G 15/6541 |
| | | | 358/527 |
| 2012/0018944 A1* | 1/2012 | Shiraishi | B42C 1/12 |
| | | | 270/58.09 |
| 2013/0208999 A1* | 8/2013 | Miyata | H04N 1/3873 |
| | | | 382/309 |
| 2015/0350469 A1* | 12/2015 | Kanamoto | G03G 15/6544 |
| | | | 358/1.15 |

* cited by examiner

FIG. 5
501
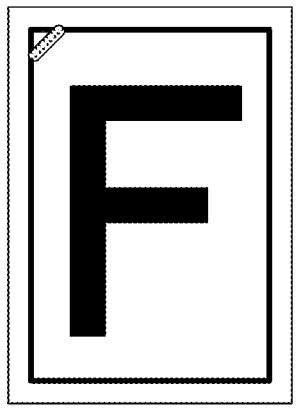
502
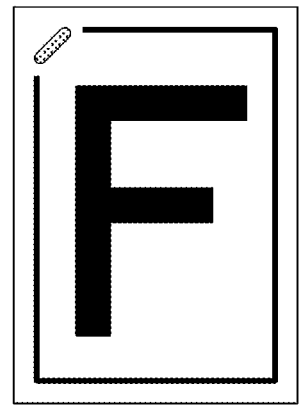

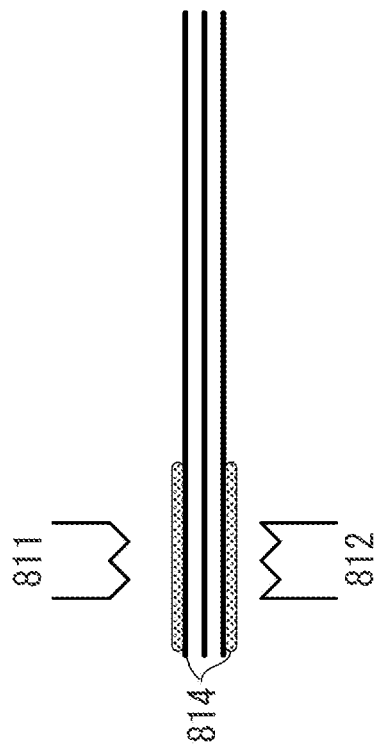
FIG. 8

FIG. 10
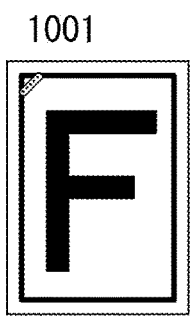
1001
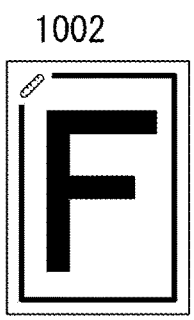
1002
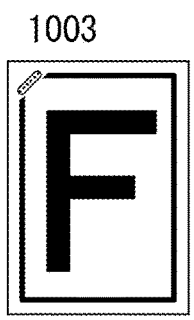
1003
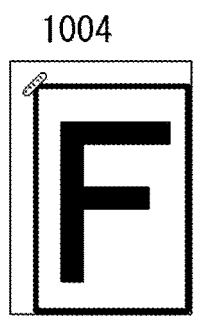
1004
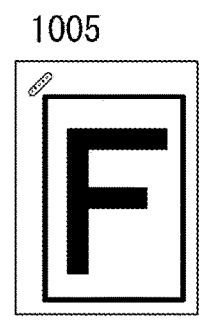
1005

US 9,733,606 B2

PRINTING APPARATUS AND CONTROL METHOD FOR DELETING AN AREA OF IMAGE DATA BEFORE PRINTING AND BINDING

CROSS REFERENCE TO RELATED APPLICATIONS

This application is a continuation of U.S. patent application Ser. No. 14/086,743 filed Nov. 21, 2013 which claims the benefit of Japanese Patent Application No. 2012-262451 filed Nov. 30, 2012. U.S. patent application Ser. No. 14/086,743 and Japanese Patent Application No. 2012-262451 are hereby incorporated by reference herein in their entirety.

BACKGROUND

Field of the Disclosure

The present invention relates to a printing apparatus configured to perform a staple process on sheets, a control method for controlling the printing apparatus, and a storage medium.

Description of the Related Art

A sheet processing apparatus configured to perform post-processing on an output printed paper is attached to some printing apparatuses with a printer function. Some multi-function peripherals (MFPs) configured to perform a copy function process also have such a sheet processing apparatus.

Representative functions of the sheet processing apparatus include a staple-binding function. The representative staple-binding function is a function for binding papers using a metallic staple. Because the stapled printed product is easy to handle for each single copy, the stapled printed product is widely used when an output product with a plurality of pages is handled.

However, recently, binding methods without using a staple are devised in consideration of the environment because the metallic staple is used for stapling. For example, there is devised a method in which a part of a set of printed papers to be bound is cut collectively in a manner leaving a part thereof without being cut and the cut end portions of the sheets are folded back to bind the set of sheets as discussed in Japanese Patent Application Laid-open No. 8-300847.

In addition, various binding methods without using a metallic staple such as a method for sticking papers with paste to bind the papers and a method for pressing papers with a particular blade and caulking the papers to bind the papers have been put into practical use.

Thus, various staple-less binding methods exist. However, there is a problem with the above mentioned binding methods when an image is positioned on the binding portion of the paper.

In such cases, toner is applied to the portion on which the image is positioned. For example, in the above-mentioned method for pressing the papers with the particular blade and caulking the papers to bind the papers, the toner infiltrates into a gap in press-binding the papers, which decreases a press-binding force. In the method for binding the binding portion with the paste, the toner is mixed with the paste portion, which disadvantageously decreases an adhesive force.

SUMMARY

According to an aspect of the present invention, a printing apparatus includes: a binding unit configured to perform a binding process for binding, without using a staple, a sheet on which an image is printed based on image data; a specifying unit configured to specify an area where the binding process is to be performed by the binding unit, the area being included in the image data; a deleting unit configured to delete image data of the area specified by the specifying unit; and a printing unit configured to print the image on the sheet based on the image data on which deleting by the deleting means is performed.

Further features of the present invention will become apparent from the following description of exemplary embodiments with reference to the attached drawings.

BRIEF DESCRIPTION OF THE DRAWINGS

FIG. 5 is a diagram illustrating a binding process in a printing apparatus according to an exemplary embodiment.

FIG. 8 is a cross-sectional view illustrating a binding process of a printing apparatus according to an exemplary embodiment.

FIG. 10 is a diagram illustrating an image processing example for stapling by a printing apparatus.

DESCRIPTION OF THE EMBODIMENTS

Next, an exemplary embodiment of the present invention will be described with reference to drawings.
<System Configuration>

Figure 1:
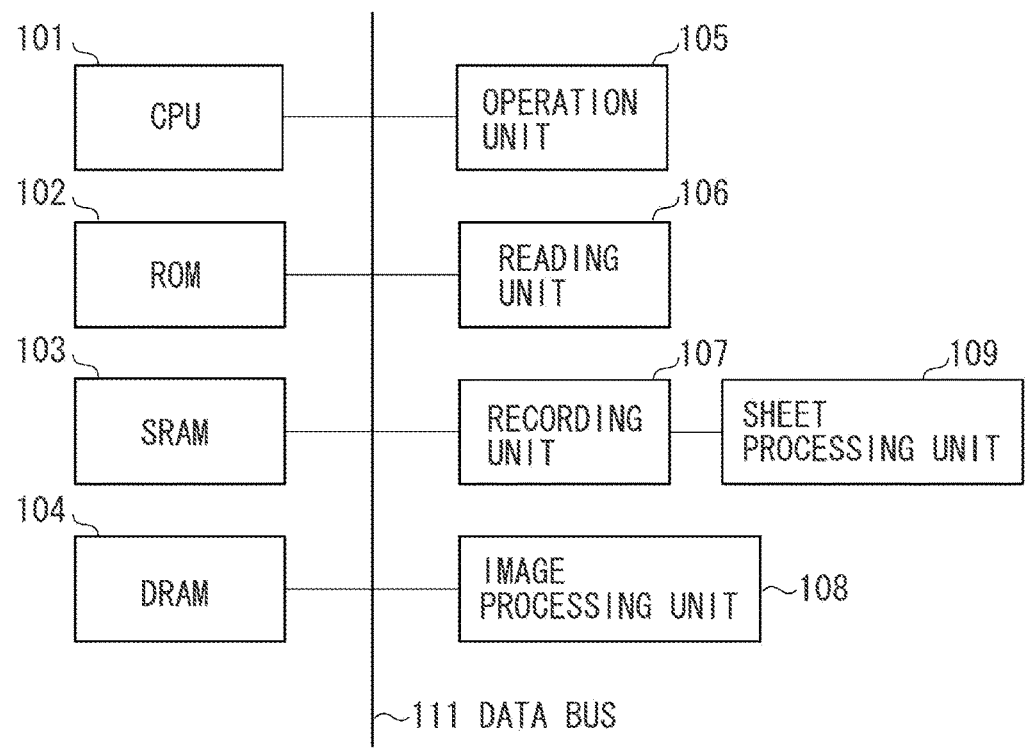
FIG. 1 is a block diagram illustrating a configuration of a printing apparatus.

FIG. 1 is a block diagram illustrating a configuration of a printing apparatus according to an exemplary embodiment. In the present exemplary embodiment, an example in which a printing apparatus includes a reading function and can be used as a copying machine will be described. In FIG. 1, a central processing unit (CPU) 101 is a control unit of a system which controls the entire apparatus. A read only memory (ROM) 102 stores a control program for the CPU 101.

A static random access memory (SRAM) 103 stores setting values registered by an operator, management data for the apparatus, and buffers for various works. The SRAM 103 is a nonvolatile SRAM backed-up by a battery, and memory contents do not disappear even if the power supply of the apparatus is turned off. Further, the SRAM 103 stores read image data.

A dynamic random access memory (DRAM) 104 stores program control parameters. An operation unit 105 is a user interface unit configured to display information of the apparatus to a user. A reading unit 106 is a device configured to read image data to convert it into binary data. The document reading for image transmission function is performed using the reading unit 106. A recording unit 107 outputs image data on a recording paper. An image processing unit 108 performs an encoding/decoding process of the image data processed by the image transmission function. These units are connected to each other via a data bus 111 and the image data is transmitted via the data bus 111.

The recording unit 107 configured to print the image data on a sheet is connected to a sheet processing unit 109, and the output paper printed by the recording unit 107 is conveyed to the sheet processing unit 109. The sheet processing unit 109 performs a post-process such as aligning input output papers, switching output trays, and performing staple-binding. The sheet processing unit 109 is configured to perform a binding process for binding a plurality of sheets (papers) using a staple, and to perform a binding process for binding the plurality of sheets without using a staple. The CPU 101 performs an image process for processing the image data so that a printing unit does not print an image at a position where a binding unit performs the binding process according to flow chart procedures to be described below in the binding process.

In the present exemplary embodiment, as described above, an original image is read by the reading unit 106, and the read image is converted into image data. The read image data is stored in the SRAM 103. In an example of a multifunction peripheral (MFP), the image processing unit 108 processes and converts the image data. Then, the recording unit 107 prints an image on the paper based on the image data, and the sheet processing unit 109 performs a post-process. The printing apparatus includes a network I/F unit (not illustrated) and a modem unit, and can form the image based on the image data received via the network I/F unit and the modem unit.

Figure 2:
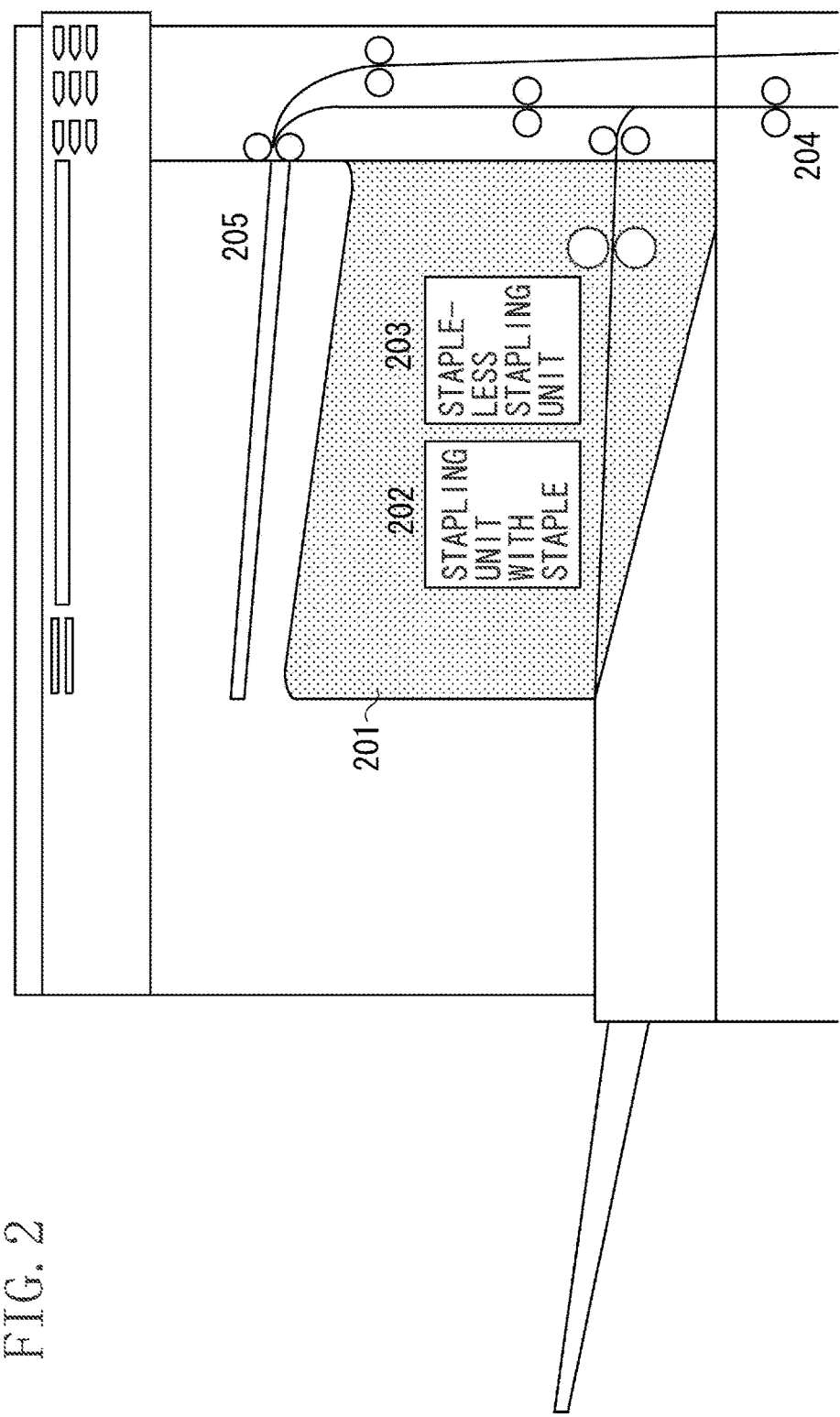
FIG. 2 is a cross-sectional view illustrating a configuration of a sheet processing unit illustrated in FIG. 1.

FIG. 2 is a cross-sectional view illustrating a configuration of the sheet processing unit 109 illustrated in FIG. 1. FIG. 2 illustrates an example of a paper processing apparatus (sheet processing unit) installed in a housing of the printing apparatus.

In FIG. 2, a paper processing apparatus 201 is connected to the recording unit 107. A paper is conveyed from the recording unit 107 via conveyance rollers 204. Conveyance rollers 205 turn over the paper in two-sided printing. When the paper is turned over, the paper passes through the conveyance rollers 205 and enters into the recording unit 107 again to be printed on its back side. In this case also, the output paper is conveyed through the conveyance rollers 204 to the paper processing apparatus 201.

The paper processing apparatus 201 includes functions for aligning and moving the output papers. However, the present exemplary embodiment focuses on the staple-binding function. A stapling unit with staple 202 performs stapling using a staple. The stapling unit with staple 202 has a function for binding papers using a metallic staple.

A stapling unit 203 provides a binding function for binding papers without using the staple. As described above, there are a number of staple-binding methods without using the staple. However, in the present exemplary embodiment, the stapling unit 203 presses, caulks, and binds the papers.

As described above, in an example of such a paper processing apparatus, both the stapling unit 202 with staple and the staple-less stapling unit 203 are mounted on the sheet processing apparatus 201.

However, because the problem described in the present specification occurs even in the configuration including only the staple-less stapling unit 203, the configuration including only the staple-less stapling unit 203 may be an example.

Figure 3:
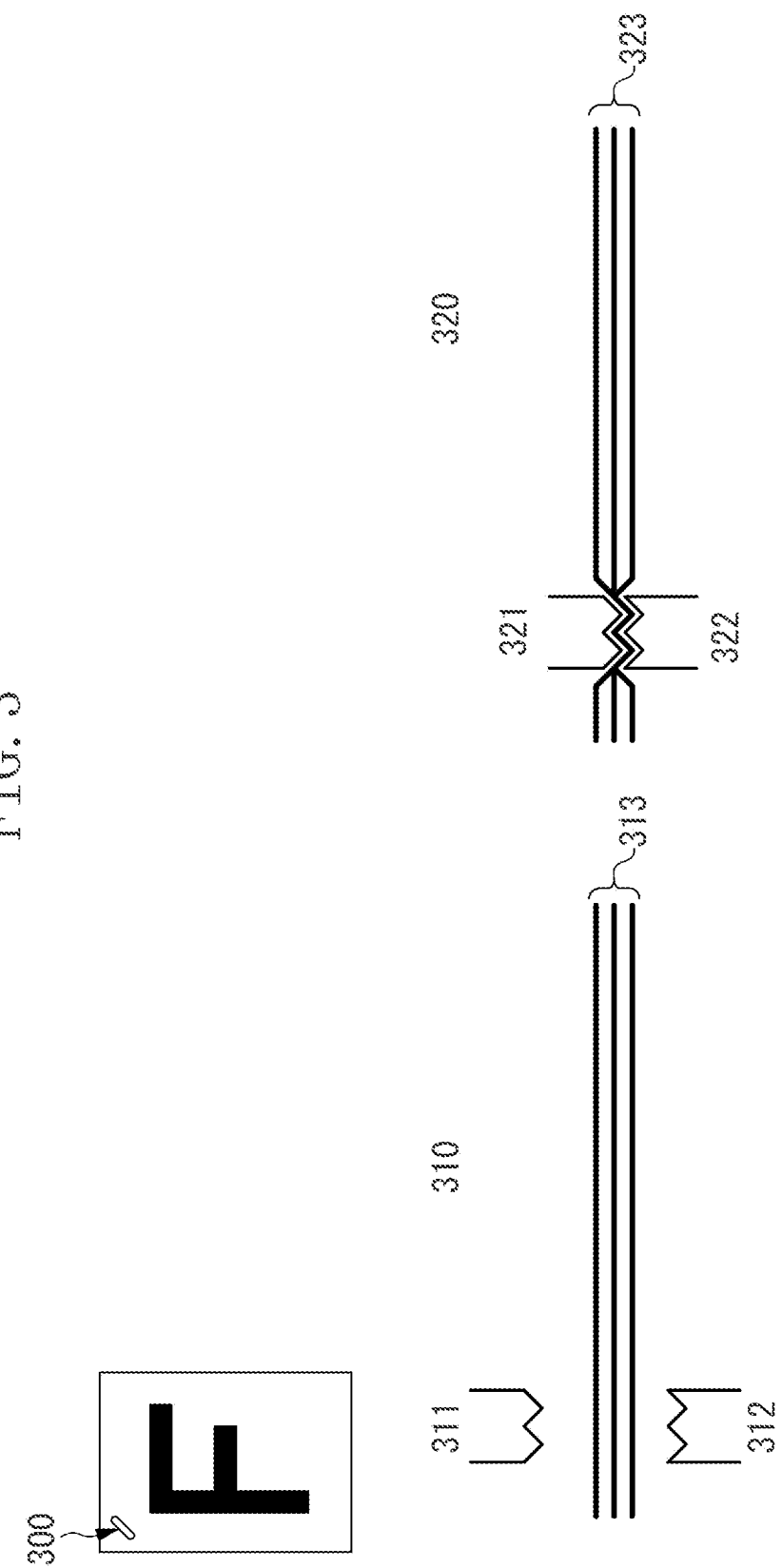
FIG. 3 is a cross-sectional view illustrating a binding process of a paper processing apparatus according to an exemplary embodiment.

FIG. 3 is a cross-sectional view illustrating a binding process of a paper processing apparatus according to the present exemplary embodiment. The present exemplary embodiment illustrates a mechanism of the method which presses, caulks, and binds papers as an example of the staple-less stapling.

The staple-less stapling is a process for performing binding at a place specified by the user in the same manner as in the conventional stapling with staple.

In FIG. 3, in an example 300, binding is performed at the top left of the document. A method for press-binding the binding portion will be described below.

In a state 310, binding is not performed yet. The state 310 illustrates output documents 313 viewed from the side. In the present exemplary embodiment, for example, three output documents are to be bound. In a press-binding portion, wavy particular blades 311 and 312 are prepared so that the output documents 313 are sandwiched therebetween. In a state 320, the output documents 313 are actually press-bound by the particular blades 311 and 312. Output documents 323 are press-bound in a state where output documents 323 are sandwiched between particular blades 321 and 322. In the present exemplary embodiment, the papers can be bound by press-binding the papers using the blades.

Such a method makes it possible to perform staple-binding without using the metallic staple.

However, when the toner is positioned at the binding portion in the staple-less stapling method, there is a problem that a press-binding force is decreased.

Figure 4:
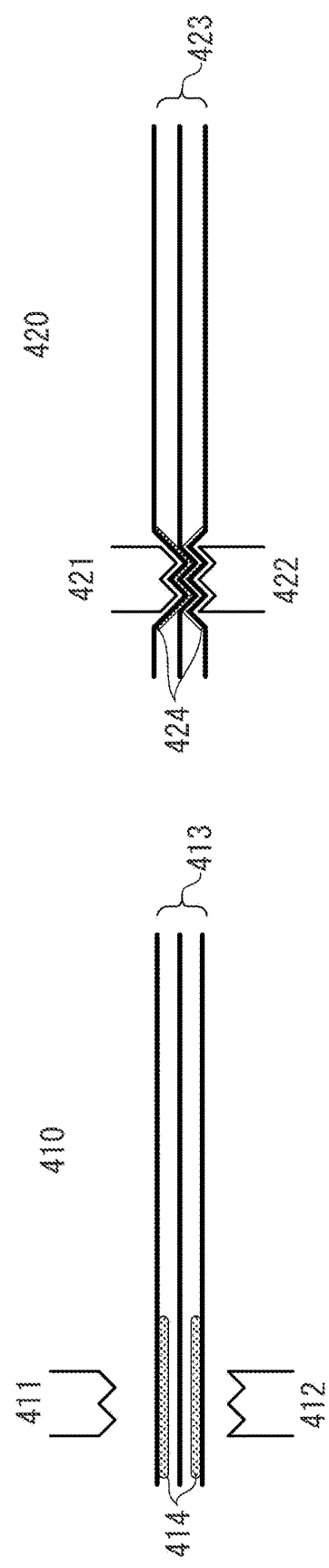
FIG. 4 is a cross-sectional view illustrating a binding process of a paper processing apparatus according to an exemplary embodiment.

FIG. 4 is a cross-sectional view illustrating a binding process by a paper processing apparatus according to the present exemplary embodiment. The present exemplary embodiment illustrates a mechanism of a method which presses, caulks, and binds papers as an example of the staple-less stapling.

In FIG. 4, in a state 410, similarly, binding is not performed yet. The state 410 illustrates output documents 413 viewed from the side. In the present exemplary embodiment, three output documents are to be bound in the same manner as in the example illustrated in FIG. 3. In a press-binding portion, particular blades 411 and 412 are prepared so that the output documents 413 are sandwiched therebetween. A case where toner 414 is positioned among the three output documents 413 is considered.

A state where output documents 423 are actually press-bound in this state is illustrated as a press-binding state 420. The output documents 423 are press-bound with the output documents 423 sandwiched between particular blades 421 and 422. However, the output documents 423 are press-bound in a state where toner 424 lies in the press-binding portion. Because the output documents 423 cannot be firmly press-bound in this state, the press-binding force is decreased.

Figure 6:
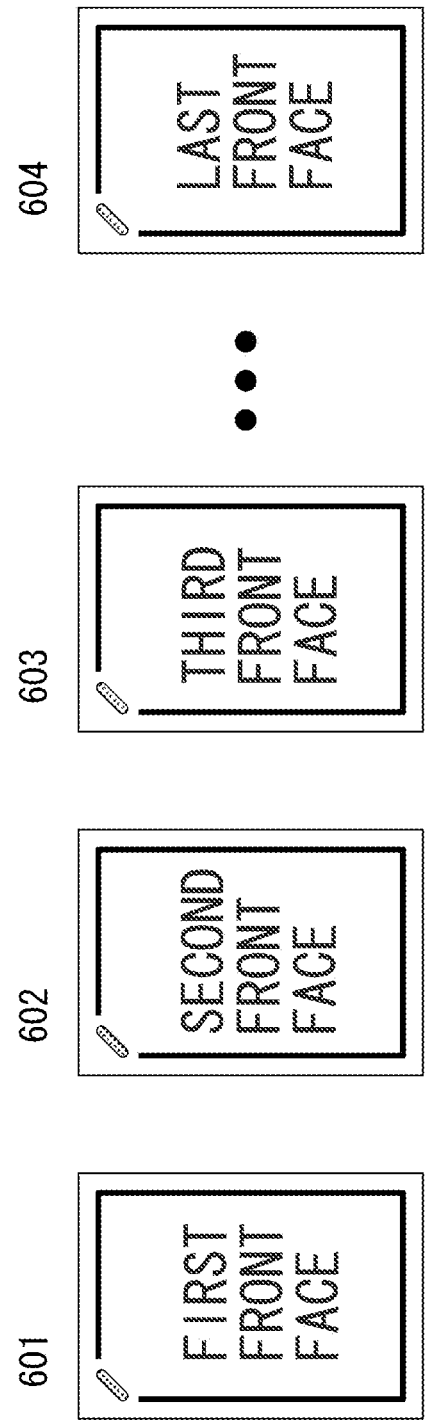
FIG. 6 is a diagram illustrating a binding process in a printing apparatus according to an exemplary embodiment.
Figure 7:
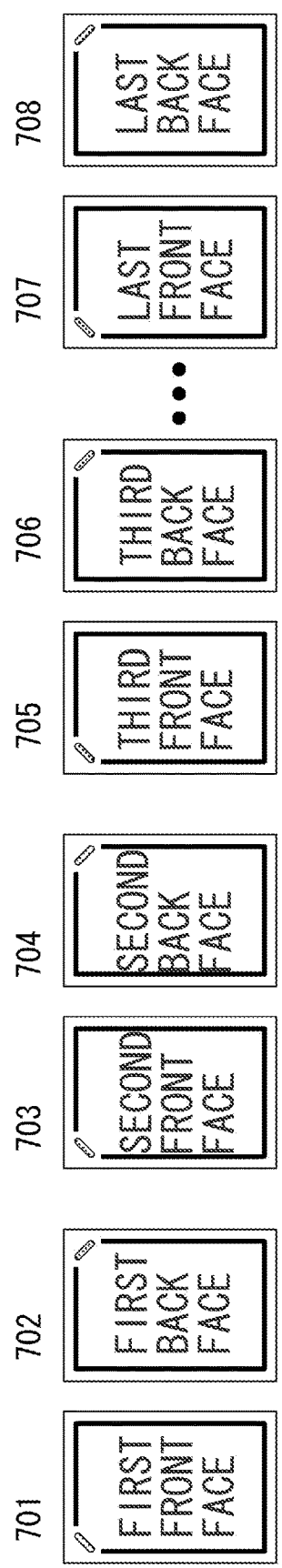
FIG. 7 is a diagram illustrating a binding process in a printing apparatus according to an exemplary embodiment.

FIGS. 5, 6, and 7 are diagrams illustrating a binding process in a printing apparatus according to the present exemplary embodiment. Hereinafter, a method for avoiding the decrease of the press-binding force will be described.

In FIG. 5, a picture 501 in which an image is positioned at a stapling place is to be printed. When staple-binding is performed, the printing image is processed so that an image is not positioned at a stapling place 502, to avoid the decrease of the press-binding force.

In one-side printing, as illustrated in FIG. 6, the printing image is processed so that an image is not positioned for each page at a place where a staple-binding process is to be performed. The present exemplary embodiment is an example in which the top left of a document is bound. The printing image is processed so that the image is not positioned at the top left of each page.

In two-sided printing, as illustrated in FIG. 7, an image process of each front face and each back face is performed. Staple-binding is similarly performed at the top left. In this case, the front face of each page is processed so that the image is not positioned at the top left. A printing image is processed so that an image is not positioned at the top right of the back face of each page so as to correspond to a binding position.

The decrease of the press-binding force can be avoided by processing the printing image in this manner to prevent the toner from being positioned at a staple-binding position.

When the user views the finished output documents in order to process the image in the method for avoiding the decrease of the press-binding force, the image is not positioned at the staple-binding position, which can cause an uncomfortable feeling in the user. Therefore, a method for avoiding the uncomfortable feeling is also devised.

FIG. 8 is a cross-sectional view illustrating a binding process of a printing apparatus according to the present exemplary embodiment. The present exemplary embodiment illustrates a binding state where toner is positioned on a front face and a back face in staple-less stapling. FIG. 8 is different from the example of FIG. 4, and does not illustrate a case where the toner is positioned between papers. FIG. 8 illustrates an example of a state where toner 814 is positioned on the uppermost front face or a state where the toner 814 is positioned on the lowermost back face.

In this case, when papers are press-bound by blades 811 and 812 in the same manner as in the method, the toner 814 is not positioned between the papers. Therefore, the toner 814 is applied to the upper and lower sides of the binding portion. However, the toner 814 does not lie in the press-binding portion, which prevents the decrease of the press-binding force. The front face and back face of the binding portion can be viewed by the user. Therefore, when the image is processed so that the toner is not positioned on the front face and back face, a processing portion can be viewed, which causes an uncomfortable feeling. However, the face located inside of the bound bundle cannot be directly viewed by the user. Therefore, even if the image is processed, the uncomfortable feeling is decreased.

Figure 9:
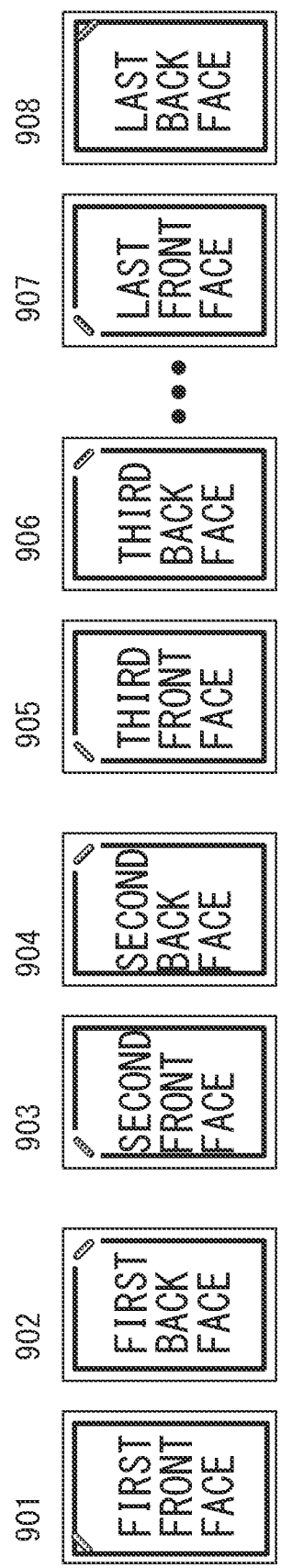
FIG. 9 is a diagram illustrating a binding process of a printing apparatus according to an exemplary embodiment.

Specifically, as illustrated in FIG. 9, an image process is performed.

FIG. 9 is a diagram illustrating a binding process of a printing apparatus according to the present exemplary embodiment. In the present exemplary embodiment, an example of top left staple-binding in two-sided printing will be described. The first front face is regardless of press-binding, and can be viewed by the user. Therefore, an image is not processed on a front face 901 of the first sheet.

On the other hand, a back face 902 of the first sheet to a front face 907 of the last sheet (905-906) form a press-bound bundle, and are not directly viewed by the user. Therefore, a control is performed so that an image process is performed and the toner is not positioned thereon. A back face 908 of the last sheet is regardless of press-binding, and can be viewed by the user. Therefore, an image is not processed on the back face 908.

The place at which the image is processed is switched and controlled in this manner, which can suppress the omission of the image placed at the place which is easily viewed by the user, and provide staple-less bound documents without decreasing a press-binding force.

Next, a plurality of methods is discussed also for a method for performing a process so that the image is not positioned at the staple-binding position.

FIG. 10 is a diagram illustrating an image processing example for stapling by a printing apparatus according to the present exemplary embodiment. In the present exemplary embodiment, an example in which the CPU 101 performs a mask process so that a part of image data to be printed at a position where a binding unit performs a binding process is a white image, will be described as a first processing example. Further, an example in which the CPU 101 performs a mask process in a triangle shape so that a part of image data to be printed at a position where a binding unit performs a binding process is a white image, will be described as a second processing example. Further, an example in which the CPU 101 processes a printing position of image data so that the image data is not printed at a position where a binding unit performs a binding process will be described as a third processing example.

In FIG. 10, an image non-processing example 1001 is an example where an image is positioned at a position where staple-binding is performed. Because toner is positioned at the staple-binding position in this state, a binding force is to be decreased. In order to avoid the decrease of the binding force, a process is performed so that the image is not positioned at the staple-binding position.

An image processing example 1002 is a method for performing a rectangle white mask process at a staple-binding position. Because the rectangle image white mask process can also be easily performed by a hardware control, a control can be performed so as not to position the toner at a binding portion without decreasing a printing speed. An image processing example 1003 is a method for performing a triangle white mask process at a staple-binding portion. Because the rectangle white mask largely masks the place viewed by the user, the mask place may be viewed. However, the triangle-shaped mask enables a beautiful finish which is not easily viewed by the user.

An image processing example 1004 illustrates a method for shifting a printing position of an image so that a staple-binding portion becomes a white space. Because the staple-binding position is the top left in the example of FIG. 10, an example in which the entire image is shifted to the bottom right so that the top left becomes the white space is illustrated.

Because the right portion and bottom portion of the image are dropped out in this case, there is also provided a method for reducing image data so that a staple-binding portion becomes a white space as in an image processing example 1005, and performing a shift process to form an image. Thus, a comfortable finish for the user can be provided by moving the entire image so that the place where staple-less stapling is performed becomes the white space.

The decrease of the binding force can be avoided by performing the image process so that the toner is not positioned at the binding position of the staple-less stapling in this manner. An output product having a comfortable finish for the user can be provided by combining various methods such as the image mask and the shift process as a method for preventing the toner from being placed at the binding position.

Figure 11:
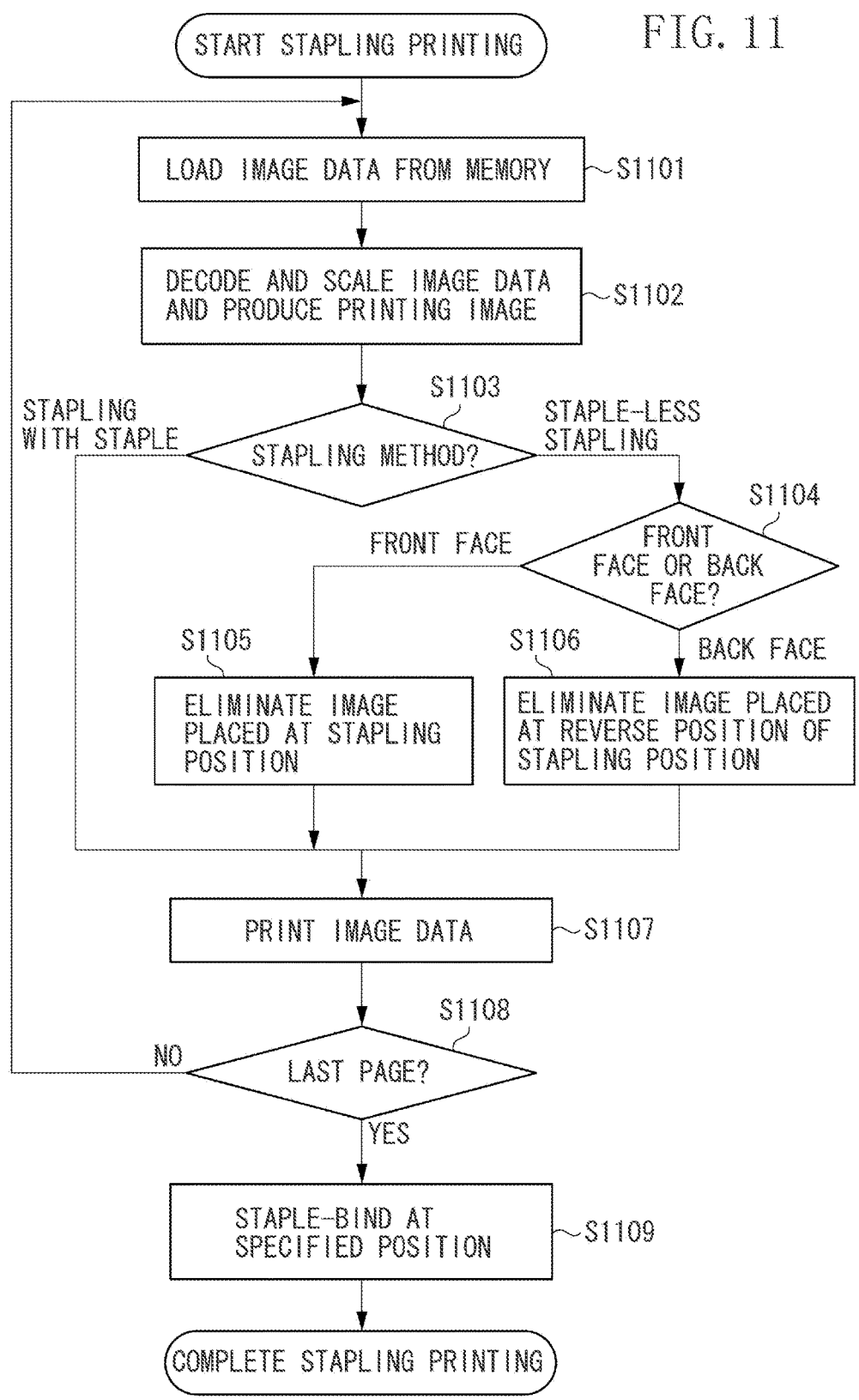
FIG. 11 is a flow chart illustrating a control method for controlling a printing apparatus.

FIG. 11 is a flow chart illustrating a control method for controlling the printing apparatus according to the present exemplary embodiment. The present exemplary embodiment is an example in which a control is performed so that an image is not placed at a staple binding position when staple-less stapling is executed. The CPU 101 executes a control program read from a ROM 102 to realize each step. Hereinafter, in the present exemplary embodiment, there will be described a process for controlling a binding process so that image data to be printed on a front face of a sheet on which the CPU 101 performs the binding process and a back face of a sheet on which the CPU 101 performs the binding process is not processed.

First, a user instructs a printing process set to perform staple-binding, to start a stapling printing process. In step S1101, the CPU 101 reads image data from an SRAM 103 when the user instructs the printing process. Next, in step S1102, the CPU 101 transmits the read image data to an image processing unit 108, and the image processing unit 108 decodes the image data to generate a printing image. In step S1103, the CPU 101 confirms a staple-binding method. In step S1107, the CPU 101 prints the image data without particularly processing the printing image when the staple-binding method is stapling with a staple ("stapling with staple" in step S1103). Because stapling is executed using a staple in the stapling with a staple, it has a binding force stronger than that of the staple-less stapling. Therefore, in the stapling with a staple, the outer side of the sheet can be bound as compared with the case of the staple-less stapling. As a result, the staple does not likely overlap with the image, and thereby the printing image need not be processed.

In step S1104, the CPU 101 determines whether the printing image is printed on the front face or back face of an output paper when the CPU 101 determines that the staple-binding method is the staple-less stapling ("staple-less stapling" in step S1103). In step S1105, the CPU 101 performs an image process so that an image is not placed at the staple-binding position when the CPU 101 determines that the printing image is printed on the front face ("front face" in step S1104). The image process method may be any of the methods illustrated in FIG. 10.

On the other hand, in step S1106, the CPU 101 performs an image process so that the image is not placed on the reverse position of the staple-binding position when the CPU 101 determines that the printing image is printed on the back face ("back face" in step S1104). For example, as illustrated in a front face 701 of FIG. 7, the CPU 101 performs an image process so that the image is not placed at the "top right" of a back face 702 of the sheet when the staple-less stapling is specified to be performed at the "top left" of the sheet. The front face 701 and back face 702 of FIG. 7 are an example where the image is a portrait (vertically long) and a binding margin is set to "left". However, the present invention is not limited thereto, and the CPU 101 performs an image process so that the image is not placed at the "bottom left" of the back face 702 of the sheet when the image is a portrait and a binding margin is "top". The CPU 101 performs an image process so that the image is not placed at the "top right" of the back face of the sheet when the image is a landscape (horizontally long) and a binding margin is set to "left". On the other hand, the CPU 101 performs an image process so that the image is not placed at the "bottom left" of the back face of the sheet when the image is a landscape and a binding margin is set to top. The image process method may be any of the methods illustrated in FIG. 10. Thus, in step S1107, the recording unit 107 prints the image data in a state where the image data is processed so that the image is not placed at the staple-binding position.

In step S1108, the CPU 101 determines whether the page is the last page. In step S1101, the CPU 101 loads a printing image of the next page from a memory, and similarly processes the printing image when the CPU 101 determines that the page is not the last page (NO in step S1108).

On the other hand, in step S1108, when the CPU 101 determines that the page is the last page (YES in step S1108), in step S1109, the sheet processing unit 109 staple-binds a specified position after all the pages are printed, and the CPU 101 ends the process. Thereby, the staple-binding printing is ended.

Figure 12:
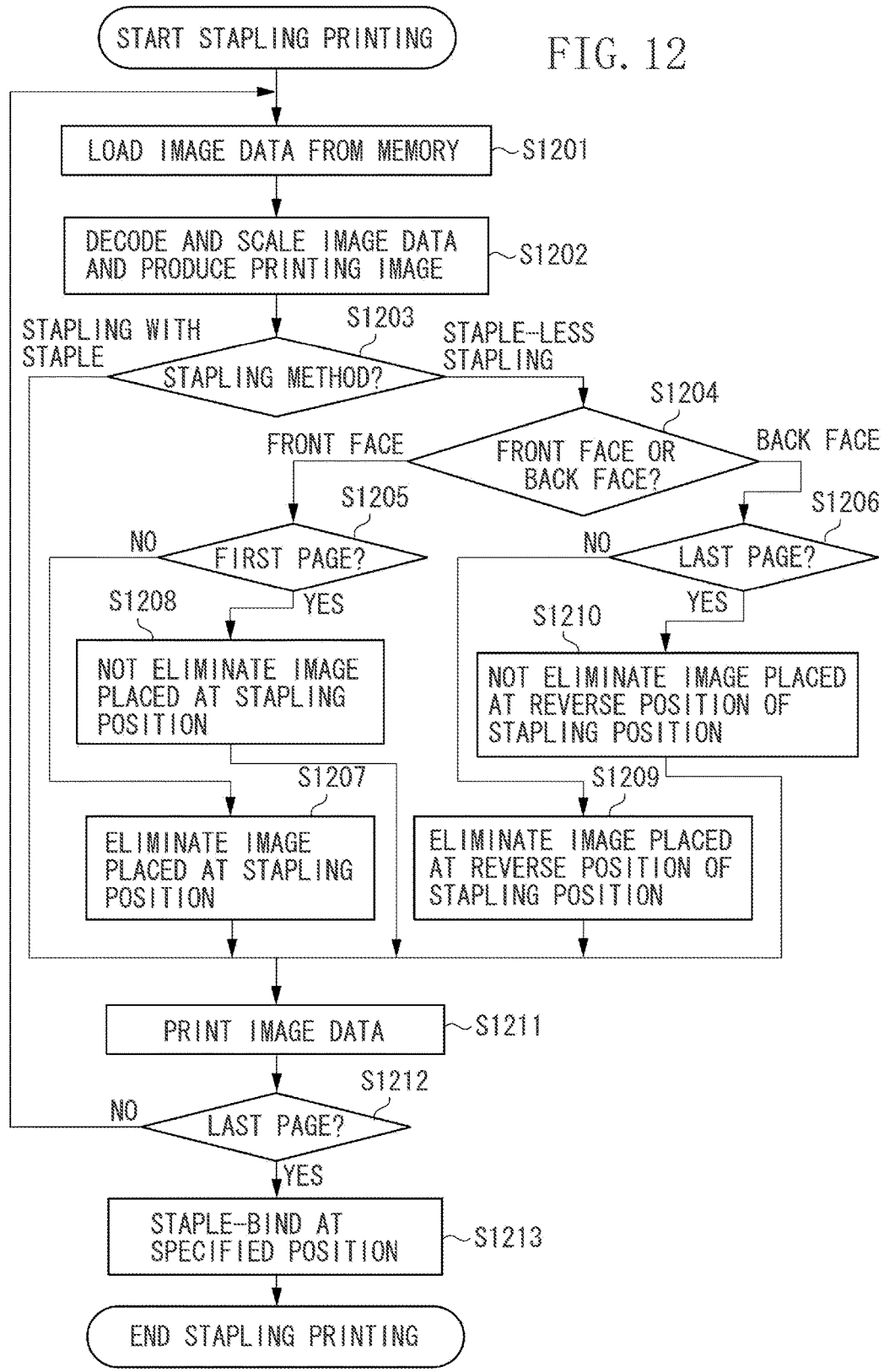
FIG. 12 is a flow chart illustrating a control method for controlling a printing apparatus.

FIG. 12 is a flow chart illustrating a control method for controlling a printing apparatus according to another exemplary embodiment. The present exemplary embodiment is an example in which a control is performed so that an image is not placed at a staple-binding position other than a front face of a first page and a back face of a last page when staple-less stapling is executed. A CPU 101 executes a control program read from a ROM 102 to realize each step. Hereinafter, in the present exemplary embodiment, there will be described a process for controlling a binding process so that image data to be printed on the front face of the first sheet on which the CPU 101 performs a binding process and the back face of the last sheet on which the CPU 101 performs a binding process, is not processed.

A user instructs a printing process set to perform staple-binding, to start a stapling printing process. In step S1201, the CPU 101 reads image data from an SRAM 103 when the user instructs the printing process. Next, in step S1202, the CPU 101 transmits the read image data to an image processing unit 108, and the image processing unit 108 decodes the image data to generate a printing image.

In step S1203, the CPU 101 determines whether a staple-binding method uses a staple or does not use the staple. In step S1211, the CPU 101 prints the image data without particularly processing the printing image when the CPU 101 determines that the staple-binding method is stapling with staple ("stapling with staple" in step S1203).

On the other hand, in step S1204, the CPU 101 determines whether the printing image is then printed on a front face or back face of an output paper when the CPU 101 determines that the staple-binding method is staple-less stapling ("staple-less stapling" in step S1203). In step S1205, the CPU 101 determines whether the page is a first page when the CPU 101 determines that the printing image is printed on the front face ("front face" in step S1204).

In step S1207, the CPU 101 performs an image process so that the image is not placed at a staple-binding position when the CPU 101 determines that the page is not the first page (NO in step S1205). The image process method may be any of the methods illustrated in FIG. 10.

On the other hand, in step S1208, the CPU 101 do not perform an image process on the page at the staple-binding position when the CPU 101 determines that the page is the first page (YES in step S1205).

In step S1204, when the CPU 101 determines that the printing image is printed on the back face ("back face" in step S1204), in step S1206, the CPU 101 further determines whether the page is the last page. In step S1209, the CPU 101 performs an image process so that the image is not placed at a position corresponding to the back face of the staple-binding position when the CPU 101 determines that the page is not the last page (NO in step S1206). For example, as illustrated in the front face 903 of FIG. 9, the CPU 101 performs an image process so that the image is not placed at the "top right" of the back face 902 of the sheet when the staple-less stapling is specified to be performed at the "top left" of the sheet. The front face 903 and back face 904 of FIG. 9 are an example when the image is a portrait (vertically long) and a binding margin is set to "left".

However, the present invention is not limited thereto, and the CPU 101 performs an image process so that the image is not placed at the "bottom left" of the back face 904 of the sheet when the image is a portrait and a binding margin is "top". The CPU 101 performs an image process so that the image is not placed at the "top right" of the back face of the sheet when the image is a landscape (horizontally long) and a binding margin is set to "left". On the other hand, the CPU 101 performs an image process so that the image is not placed at the "bottom left" of the back face of the sheet when the image is a landscape and a binding margin is set to top. The image process method may be any of the methods illustrated in FIG. 10.

On the other hand, in step S1210, the CPU 101 do not perform an image process on the page about the staple-binding position when the CPU 101 determines that the page is the last page (YES in step S1206). Thus, in step S1211, the CPU 101 performs appropriate determination so that the image is not placed on the staple-binding position, and a recording unit 107 prints the image data in a state where the image data is processed.

In step S1212, the CPU 101 determines whether the printed page is the last page. In step S1201, the CPU 101 loads a printing image of the next page from a memory when the CPU 101 determines that the page is not the last page (NO in step S1212), and similarly processes the printing image.

On the other hand, in step S1213, the sheet processing unit 109 staple-binds a specified position after all the pages are printed when the CPU 101 determines that the printed page is the last page (YES in step S1212), and the CPU 101 ends the process. Thereby, the staple-binding printing is ended.

The present invention is not limited to the exemplary embodiments described above, and various modifications (including an organic combination of the exemplary embodiments) are possible based on the features of the present invention. Those modifications are included in the scope of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

What is claimed is:

1. A print control apparatus comprising:
   a processor; and
   a memory storing instructions which, when executed by the processor, causes the print control apparatus:
   to determine whether a first binding process without using a staple or a second binding process with a staple has been specified; and
   to perform a data process for preventing a part of an image related to print data to be printed from being printed on a sheet, based on a determination that the first binding process has been specified, wherein the part of an image corresponds to at least a position where the first binding process is to be performed;
   not to perform the data process to print data based on a determination that the second binding process has been specified, and
   to control a print unit so that the print unit performs a printing process to the sheet based on the image data on which the data process has been performed in a case that the first binding process has been specified.

2. The print control apparatus according to claim 1, wherein the processor executes instruction to mask the part of the image corresponding to at least the position where the first binding process is to be performed in the data process.

3. The print control apparatus according to claim 1, wherein the processor executes instruction to perform modification on image data such that the part of image corresponding to at least the position where the first binding process is to be performed is not printed in the data process.

4. The print control apparatus according to claim 3, wherein the processor executes instruction not to perform the modification on image data corresponding to a front face of a first sheet included in a plurality of sheets to be bounded by the first binding process and a back face of a last sheet included in the plurality of sheets.

5. The print control apparatus according to claim 1, further comprising the print unit configured to print an image on a sheet.

6. The print control apparatus according to claim 1, further comprising a first binding unit configured to perform the first binding process.

7. The print control apparatus according to claim 1, wherein the first binding process is for binding a plurality of sheets by pressing the plurality of sheets.

8. The print control apparatus according to claim 1,
   wherein the processor executes instruction to perform the data process to print data to be printed such that the part of an image becomes a white image,
   the part of an image corresponds to at least the position where the first binding process is to be performed.

9. The print control apparatus according to claim 1, wherein sheets are nipped and pressed by a first surface and a second surface thereby the sheets are bound in the first binding process, each of the first surface and second surface including concaves and convexes,
   the position where the first binding process is to be performed is at a position where the first surface and the second surface nip and press the sheets.

10. The print control apparatus according to claim 1,
    wherein the part of an image that is not printed on a sheet is triangle.

11. The print control apparatus according to claim 1, wherein a corner portion of the sheet is pressed thereby the sheets are bound in the first binding process, a longitudinal line of a pressed area of the sheet that is pressed in the first binding process is inclined with respect to an edge of the sheet, the part of an image that is not printed on a sheet is triangle, and one side of the triangular part of the image is along the longitudinal line of the pressed area.

12. The print control apparatus according to claim 1, wherein the part of an image that is not printed on a sheet is rectangle.

13. The print control apparatus according to claim 1, wherein the processor executes instruction to perform the data process to print data to be printed such that the part of an image related to the print data is not printed on a sheet and remainder of the image related to the print data is printed.

14. A print control method comprising:

determining whether a first binding process without using a staple or a second binding process with a staple has been specified; and performing a data process for preventing a part of an image related to print data to be printed from being printed on a sheet, based on a determination that the first binding process has been specified, wherein the part of an image corresponds to at least a position where the first binding process is to be performed; and not performing the data process to print data based on a determination that the second binding process has been specified, and controlling a print unit so that the print unit performs a printing process to the sheet based on the image data on which the data process has been performed in a case that the first binding process has been specified.

15. A non-transitory computer-readable storage medium storing a program that causes a computer to perform a print control method, the method comprising:

determining whether a first binding process without using a staple or a second binding process with a staple has been specified; and performing a data process for preventing a part of an image related to print data to be printed from being printed on a sheet, based on a determination that the first binding process has been specified, wherein the part of an image corresponds to at least a position where the first binding process is to be performed;

not performing the data process to print data based on a determination that the second binding process has been specified, and controlling a print unit so that the print unit performs a printing process to the sheet based on the image data on which the data process has been performed in a case that the first binding process has been specified.

* * * * *